US009971592B2

(12) United States Patent
Gupta et al.

(10) Patent No.: US 9,971,592 B2
(45) Date of Patent: May 15, 2018

(54) METHOD AND APPARATUS FOR A WORKFLOW-BASED SOFTWARE PURCHASE

(71) Applicant: Adobe Systems Inc., San Jose, CA (US)

(72) Inventors: Saurabh Gupta, New Delhi (IN); Aditya Falodiya, Cupertino, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 655 days.

(21) Appl. No.: 13/779,117

(22) Filed: Feb. 27, 2013

(65) Prior Publication Data
US 2014/0244445 A1    Aug. 28, 2014

(51) Int. Cl.
| | |
|---|---|
| *G06F 9/44* | (2018.01) |
| *G06Q 10/10* | (2012.01) |
| *G06F 9/445* | (2018.01) |
| *G06F 21/10* | (2013.01) |
| *G06Q 30/06* | (2012.01) |
| *G06Q 10/06* | (2012.01) |

(52) U.S. Cl.
CPC ............... *G06F 8/70* (2013.01); *G06Q 10/06* (2013.01); *G06Q 10/103* (2013.01); *G06Q 30/0601* (2013.01); *G06Q 30/0641* (2013.01); *G06F 8/60* (2013.01)

(58) Field of Classification Search
USPC .......................................................... 705/59
See application file for complete search history.

(56) References Cited

U.S. PATENT DOCUMENTS

| | | | | |
|---|---|---|---|---|
| 5,950,010 | A  * | 9/1999 | Hesse ....................... | G06F 8/61 709/220 |
| 7,890,428 | B2 * | 2/2011 | Brooks .................... | G06F 21/10 705/59 |
| 2004/0098314 | A1* | 5/2004 | Cool ......................... | G06F 8/61 705/26.5 |
| 2006/0271863 | A1* | 11/2006 | Cortesi ................... | G06F 17/50 715/763 |
| 2008/0098216 | A1* | 4/2008 | Scovetta ................ | H04N 7/162 713/165 |
| 2011/0093371 | A1* | 4/2011 | Clemm ................... | G06F 21/10 705/34 |

\* cited by examiner

*Primary Examiner* — Jonathan Ng
*Assistant Examiner* — Devin C Hein
(74) *Attorney, Agent, or Firm* — Keller Jolley Preece

(57) ABSTRACT

A computer implemented method and apparatus for a subscription workflow. The method comprises receiving an input indicative of features of a plurality of software products to enable performance of one or more workflows, wherein the input is indicative of features that are less than all of the features of each software product in the plurality of software products; and enabling the features from the plurality of software products to be utilized on a computer to perform the one or more workflows.

20 Claims, 4 Drawing Sheets

METHOD AND APPARATUS FOR A WORKFLOW-BASED SOFTWARE PURCHASE

BACKGROUND OF THE INVENTION

Field of the Invention

Embodiments of the present invention generally relate to software application purchasing and more particularly, to a method and apparatus for a workflow-based software purchase.

Description of the Related Art

Many businesses purchase software products to assist in performing the tasks of the business. Often businesses do not rely on a single product, but need a set of software products because the business works in a particular domain that requires an integrated workflow utilizing a number of software products. Although the business requires a set of software products, the business does not need all of the features supplied in each of the software products.

For example, a small fashion design business of 20 designers may use ADOBE® software products for creating artwork. They may require certain features of ADOBE® ILLUSTRATOR® necessary for creating illustrations and sketches for concept presentation, certain features of ADOBE® PHOTOSHOP® necessary for applying filters and changing the hue/saturation of the created illustrations and sketches, and certain features of ADOBE® LIGHTROOM® necessary for image organization and rating. Currently, to implement this workflow, the small business is required to either purchase 20 licenses of each product, buy 20 licenses of a Suite of products, purchase individual product subscriptions, which means subscribing to 20 monthly subscriptions of PHOTOSHOP® and ILLUSTRATOR®, and 20 perpetual licenses of LIGHTROOM®, or finally, purchasing 20 ADOBE® CREATIVE CLOUD® subscriptions. However, this results in the business buying products with more features than the business actually needs.

Therefore, there is a need for a method and apparatus for a workflow-based software purchase.

SUMMARY OF THE INVENTION

A method and apparatus for a workflow-based software purchase as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
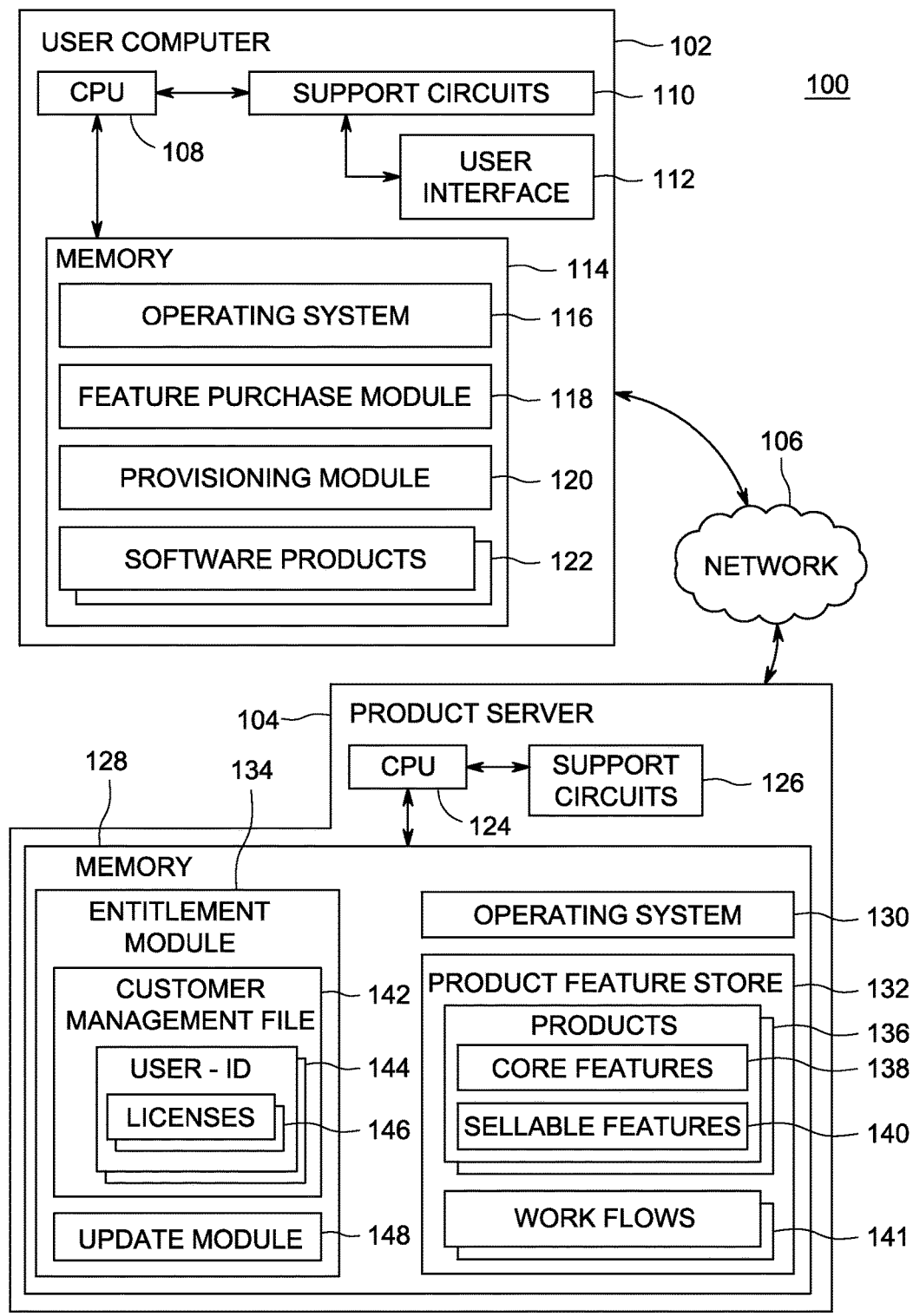
FIG. 1 is a block diagram of a system for a workflow-based software purchase, according to one or more embodiments.

While the method and apparatus is described herein by way of example for several embodiments and illustrative drawings, those skilled in the art will recognize that the method and apparatus for a workflow-based software purchase is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for a workflow-based software purchase defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. As used herein, "purchase" comprises a right to use one or more features of a software product for a specific period of time, wherein the period of time may be renewable or may be unlimited.

DETAILED DESCRIPTION OF EMBODIMENTS

Embodiments of the present invention include a method and apparatus for a workflow-based software purchase. The embodiments present a user with one or more features from a plurality of software products that accomplish a workflow. Once a workflow is selected, the software products necessary to perform the workflow are downloaded, installed, and licensed to the user. The features purchased to accomplish the workflow are licensed, or subscribed to, for a predetermined period of time. Each time the user opens the software product on the user's computer, the features for which the user has an active license are enabled on the user's computer.

In some embodiments, the user may select individual features of one or more software products to create a custom workflow. The features are licensed to the user and upon activation of the software product on the user's computer, the features for which the user has an active license are enabled on the user's computer.

Various embodiments of a method and apparatus for a workflow-based software purchase are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for a workflow-based software purchase, according to one or more embodiments. The system 100 includes a user computer 102 and a product server 104, communicatively coupled to one another over a network 106. The user computer 102 includes a Central Processing Unit (CPU) 108, support circuits 110, a user interface 112, and a memory 114. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, a feature purchase module 118, a provisioning module 120, and one or more software products 122. The operating system 116 may include various commercially known operating systems. The feature purchase module 118 may be a desktop application, such as ADOBE Application Manager (AAM), or any web page through which a user may select different workflows.

The product server 104 includes a CPU 124, support circuits 126, and a memory 128. The CPU 124 may include one or more commercially available microprocessors or microcontrollers that facilitate data processing and storage. The various support circuits 126 facilitate the operation of the CPU 124 and include one or more clock circuits, power supplies, cache, input/output circuits, and the like. The memory 128 includes at least one of Read Only Memory (ROM), Random Access Memory (RAM), disk drive storage, optical storage, removable storage and/or the like.

The memory 128 includes an operating system 130, a product feature store 132, and an entitlement module 134. The product feature store 132 includes a plurality of products 136 and a plurality of workflows 141. Each product 136 includes core features 138 and sellable features 140. The entitlement module 134 includes a customer management file 142 and an update module 148. The customer management file 142 includes a plurality of userIDs 144. Each userID 144 is associated with one or more licenses 146. The operating system 130 may include various commercially known operating systems.

When products 136 are developed, the product 136 is modularized to create individual features. There are two types of features, namely core features 138 and sellable features 140. Core features 138 are features of the product 136 that form the foundation of the product and are needed regardless of which sellable features 140 are purchased. Sellable features 140, or licensable features, are independent features, which are downloaded and enabled only when a corresponding license for those features is purchased. The products 136 are stored in the product feature store 132.

When a user wishes to purchase a workflow 141 of features across a set of software products, the user may access the product feature store 132 from the user computer 102. A plurality of software products, features, and workflows is displayed on the user-interface 112 of the user computer 102. In addition to or as an alternative to selecting one or more software products, a user may select one or more workflows 141. Upon successful purchase of selected workflows 141, the licenses 146 for the purchased workflows 141 are stored in the customer management file 142 with a userID 133.

The features of the products 136, which are associated with the licenses 146, that is, the core features 138 and selected sellable features 140, are downloaded to the user computer 102. The feature purchase module 118 installs the software products 122 on the user computer 102 and activates the user's licenses 146 for the software products 122. When the user uses a software product 122, the provisioning module 120 checks the status of the user's licenses 146 on the product server 104 and enables the features of the workflows 141 for which a license 146 is active.

The update module 148 maintains the licenses 146 by periodically checking that subscriptions are up-to-date and deactivates any license 146 where the subscription has expired or is unpaid. When a license is deactivated for a user, the features of software product 122 associated with that license are disabled on the user computer 102.

Figure 2:
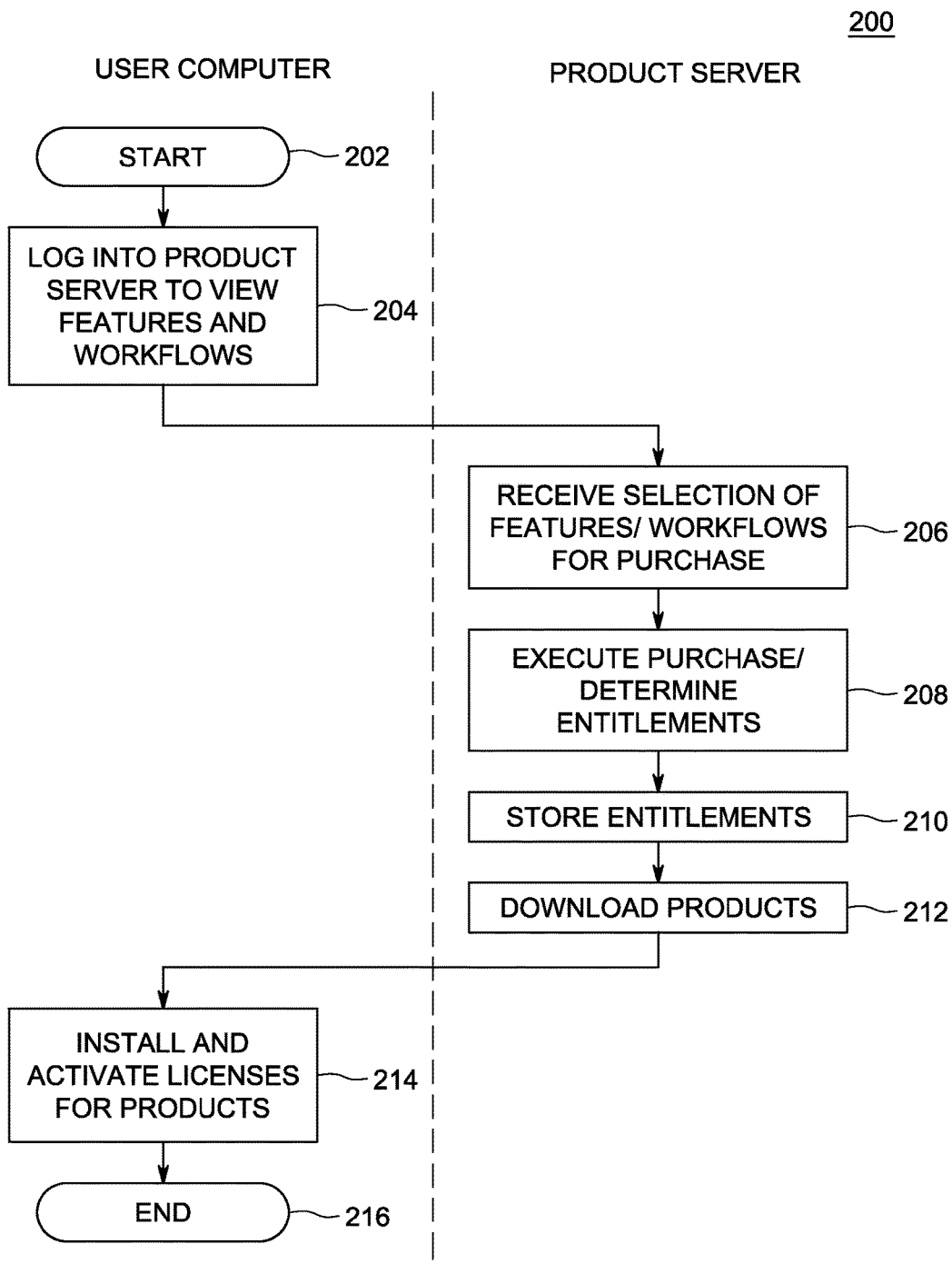
FIG. 2 depicts a flow diagram of a method for selecting features from a set of products as performed by the feature purchase module of FIG. 1, according to one or more embodiments.

FIG. 2 depicts a flow diagram of a method 200 for selecting features from a product or a set of products as performed by the feature purchase module 118 of FIG. 1, according to one or more embodiments. The method 200 displays a plurality of products and selectable features from a set of products to perform a workflow. The method 200 facilitates selection, purchase, and installation of selected features. FIG. 2 depicts an embodiment of the invention, wherein specific steps are performed on a user computer and other steps are performed on a product server. This is not meant to be limiting. One or more steps depicted as being performed on the product server may be performed on the user computer and vice versa.

The method 200 starts at step 202 and proceeds to step 204. At step 204, the method 200 facilitates logging into a product server, where a user may view a plurality of products and sellable features for each of those products. All sellable features are identified as a subscription aware feature entity (SAFE). A product is a collection of both core and SAFE features. For example, ADOBE® AFTER EFFECTS® may include core features, such as "Layer Transformation", "Frame Blending", and "Auto Trace". ADOBE® AFTER EFFECTS® has SAFE features, such as "3D Channel Effects", "Audio Effects", and "Animation Effects", which may be purchased as part of a workflow. When any SAFE feature of ADOBE® AFTER EFFECTS® is purchased, the core features are included with the purchase. In another example, ADOBE® ILLUSTRATOR® may include core features "Object Pattern", "Object Blending", "Extended Fonts" and SAFE features such as "3D Effect", "Pathfinder Effect", and "Warn Effect". A product, for example $P_a$ may be defined as:

$$P_a=\{f_1,f_2,\ldots,f_n\}, \text{ where f denotes a SAFE feature.}$$

A suite is a collection of products. A suite may be defined as $$S_a=\{P_a,P_b,\ldots,P_m\}$$

A workflow is a collection of features from various products needed to deliver a solution or task. A workflow may be defined by a workflow provider that has built the workflow logic into the products by creating modularized features that work independent of one another. A workflow may be a set that includes elements $f_iP_k$, where each $f_iP_k$ denotes ith SAFE feature of Product k. For example, a workflow may be defined as:

$$W_a=\{f_1P_a,f_2P_b,f_1P_c,f_4P_d,f_3P_e\}$$

In this example, the workflow contains feature 1 of Product a, feature 2 of Product b, feature 1 of Product c, feature 4 of Product d, and feature 3 of product e. The method 200 proceeds to step 206, where the method 200 receives a selection of one or more workflows a user would like to purchase.

The method 200 proceeds to step 208, where the method 200, facilitates the purchase of a subscription for the selected workflows and determines the entitlements based on the purchase. Because workflows are purchased on a subscription basis, and multiple workflows may be purchased, it is possible to purchase a subscription to a product feature that is contained in more than one workflow. For example, ADOBE® PHOTOSHOP® has a SAFE feature "3D Image Editing". Two workflows, namely "3D Workflow" and "Automations Workflow" both contain ADOBE® PHOTOSHOP®'s SAFE "3D Image Editing" feature. A user may have subscribed to the "3D Workflow" for a month, beginning on June 1. The user may also have subscribed to the "Automations Workflow" for a month, beginning on June 15. The method 200 determines the entitlement for the "3D Image Editing" feature is for the maximum period of the two entitlements, in this example, for the period beginning on June 1 and ending one month after June 15, that is, on July 15.

However, if a user purchases subscriptions for two different workflows, each containing a different feature of the same product, each feature is enabled for the respective durations of the entitlements. For example, ADOBE® PHOTOSHOP® contains SAFE "3D Image Editing", "Automation Support", and "Layering Support" features. A "3D Workflow" may include "3D Image Editing" and "Layering Support". An "Automations Workflow" may include "Automation Support". If a user subscribed for a month to the "3D Workflow" on June 1 and subscribed for a month to the "Automations Workflow" on June 15, 3D Image Editing" and "Layering Support" features of ADOBE® PHOTOSHOP® are enabled for one month starting June 1 and the "Automations Support" feature of ADOBE® PHOTOSHOP® is enabled for one month starting on June 15.

The method 200 proceeds to step 210, where the method 200 stores the entitlements in a customer management file. The method 200 stores information associated with the entitlements including, but not limited to, a UserID associated with the user, the product, a product version, a platform on which the product runs, a language of the product, the purchased SAFE, an entitlement statues, and the like. A workflow entitlement may be created for the user in the following format:

<UserID, Workflow-ID, Entitlement-Status>.

For example, if John Smith purchases workflow $W_a$, a workflow entitlement may be created for John Smith as follows:

{jsmith@company.com, $W_a$, active}

Further, product level sub-entitlements may be created for the used for each product in the workflow, for example:

{jsmith@company.com, $P_a$, $f_1$, active}
{jsmith@company.com, $P_b$, $f_2$, active}
{jsmith@company.com, $P_c$, $f_1$, active}
{jsmith@company.com, $P_d$, $f_4$, active}
{jsmith@company.com, $P_e$, $f_3$, active}

The method 200 proceeds to step 212, where the method 200 facilitates downloading the purchased products to a user's computer. All products for which a SAFE feature is purchased are downloaded to the user's computer.

The method 200 proceeds to step 214, where the method 200 installs and activates licenses for the purchased product features on the user's computer based on the entitlements. The method 200 proceeds to step 216 and ends.

Figure 3:
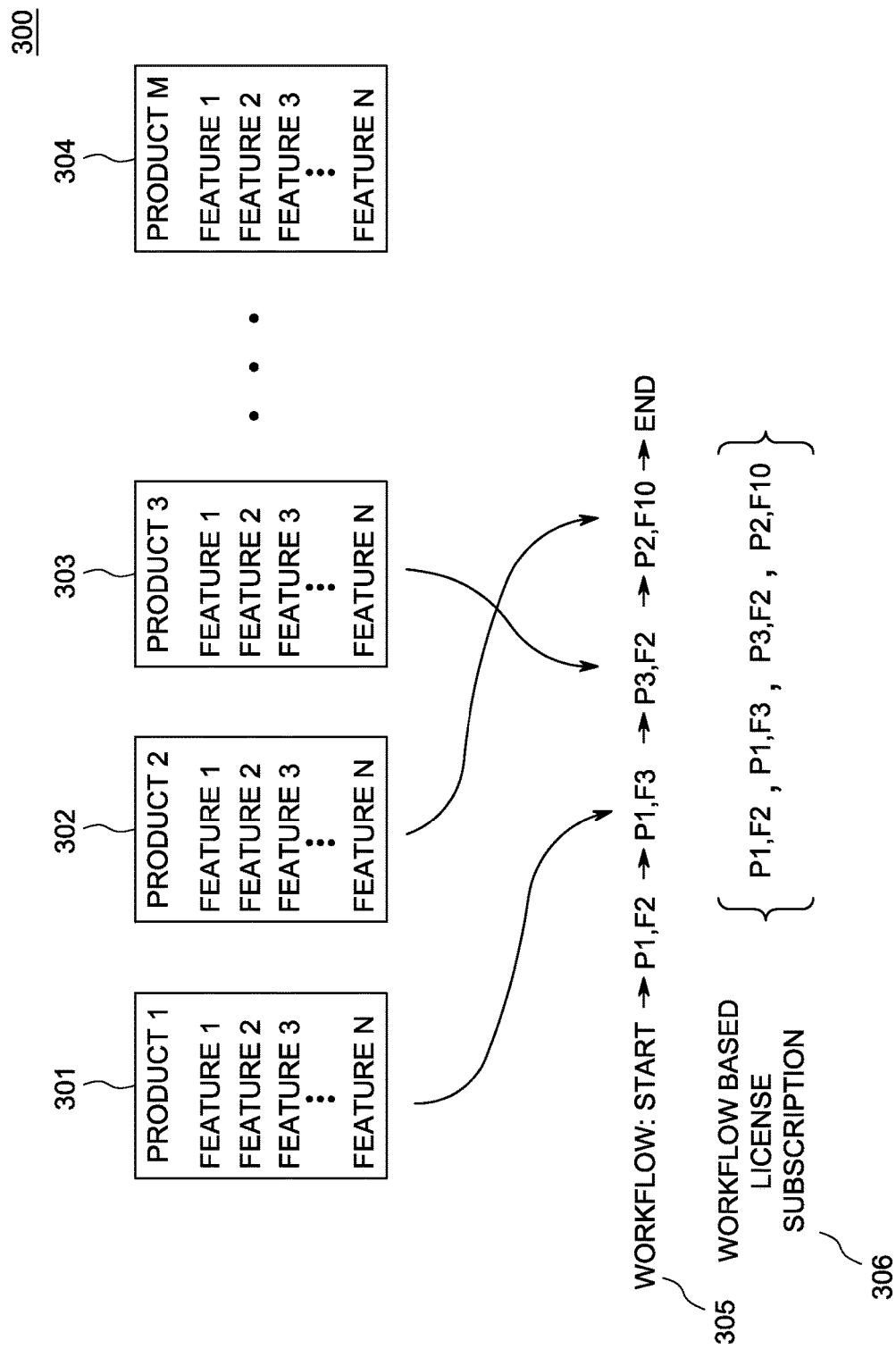
FIG. 3 depicts an illustration of the assembly of a workflow, according to one or more embodiments.

FIG. 3 depicts an illustration 300 of the assembly of a workflow, according to one or more embodiments. A plurality of products 301, 302, 303, 304, each include a plurality of features. A workflow 305 includes feature 2 and feature 3 of product 1, feature 2 of product 3, and feature 10 of product 2. The workflow 305 uses the selected features from the plurality of products 301, 302, and 303 accomplish a task. Although the workflow may be performed in sequence, use of the selected features may be used in any order. The workflow based license subscription 306 defines the product features that are purchased based on the workflow. When a user who has subscribed to this workflow opens, for example, product 1 on the user's computer, feature2 and feature 3 are enabled.

Figure 4:
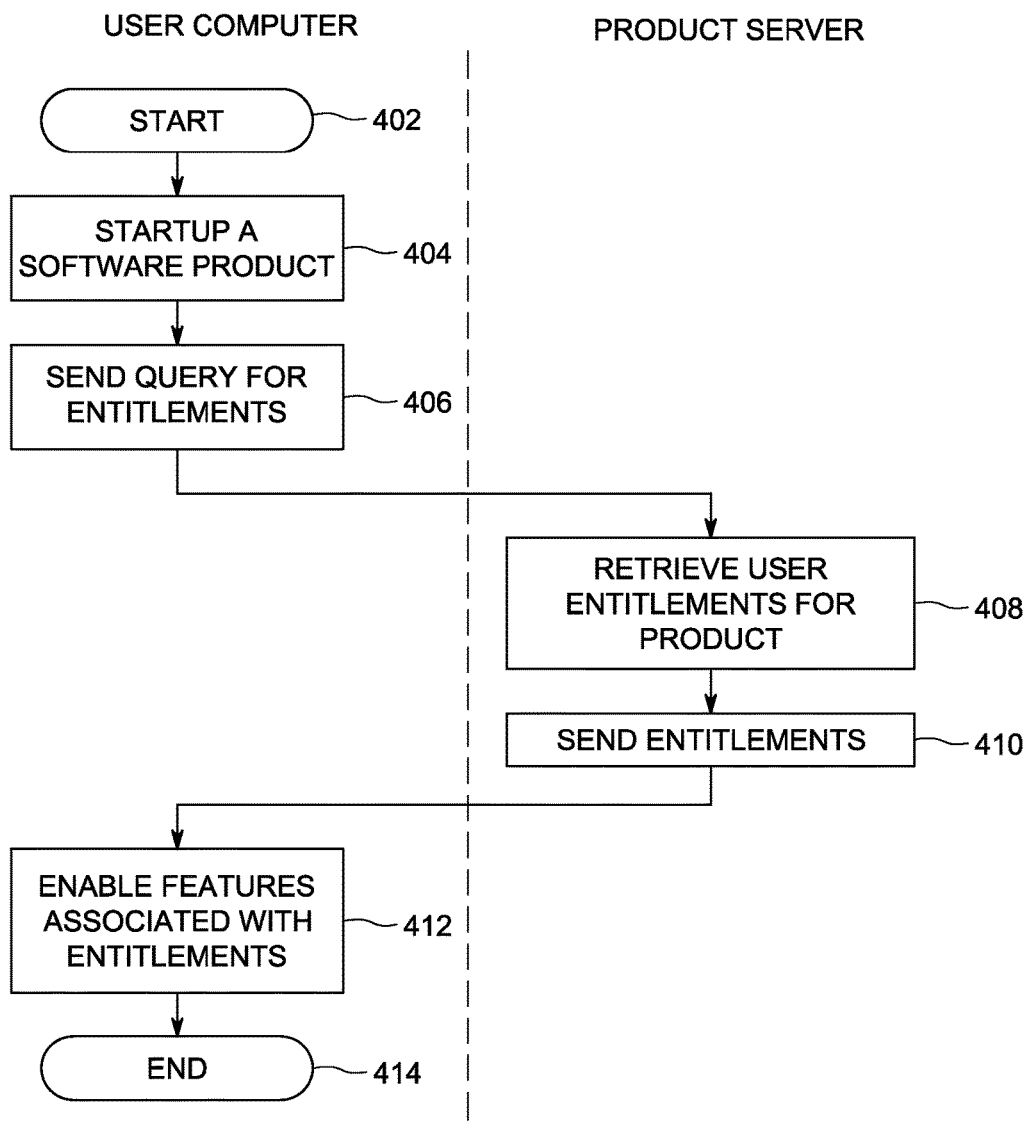
FIG. 4 depicts a flow diagram of a method for enabling purchased workflows as performed by the provisioning module of FIG. 1, according to one or more embodiments.

FIG. 4 depicts a flow diagram of a method 400 for enabling purchased workflows as performed by the provisioning module 120 of FIG. 1, according to one or more embodiments. The method 400 determines the entitlements for products on a user's computer and activates one or more product features for each of the plurality of products to which the user is entitled.

The method 400 starts at step 402 and proceeds to step 404, where the method 400 receives a command to startup a software product on a user's computer.

The method 400 proceeds to step 406, where the method 400 facilitates sending a query to a product server. The software product is associated with a user's UserID and the user's computer MachineID on the product server. The method 400 sends the userID and the MachineID to the product server so that the product server may determine for what features the user is subscribed for the software products.

The method 400 proceeds to step 408, where the method 400 looks up the userID and determines entitlement status against the Machine ID in a customer management file. The customer management file stores information for products and features associated with workflows for which the customer has purchased a subscription. However, because subscription may be for a pre-defined period of time or may be renewable, a subscription to a feature may have been purchase, but the subscription may have expired and may not have been renewed. Only the product features for which a subscription is active are considered to be entitlements. The information may be stored as follows:

<MachineID, Product, <Available Features with Status>, UserID>

For example, if John Smith has a MachineID of Mach1, the information may be as follows:

{Mach1, $P_a$, {{$f_1$, Active}, {$f_2$, Inactive}, {$f_3$, Inactive}, {$f_4$, Inactive}}, jsmith@company.com}

The method 400 proceeds to step 410, where the method 400 facilitates sending the entitlements to the user computer.

The method 400 proceeds to step 412, where the method 400 enables the features of the products for which the user is entitled. In the previous example, feature 1 of Product a is enabled on the user's computer. Because each product is modularized, features are able to be enabled independently. The method 400 always enables the core features of each product and then enables the additional features based on the entitlements.

The method 400 proceeds to step 414 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving, from a client device based on input from a user, a selection of a computer-based task requiring independent features from multiple independent software products, wherein when performed in sequence, the independent features generate a predetermined workflow to accomplish the computer-based task;
determining a plurality of features for performing the predetermined workflow;
determining a plurality of independent software products based on the determined plurality of features, wherein each software product of the plurality of independent software products comprises at least one feature of the determined plurality of features, and wherein each software product of the plurality of independent software products comprises additional features in addition to the at least one feature of the determined plurality of features;
generating a workflow entitlement that indicates the predetermined workflow is activated for the user, wherein the workflow entitlement comprises a plurality of sub-entitlements corresponding to the determined plurality of features within the plurality of independent software products;

providing each software product of the plurality of independent software products to the client device for installation on the client device;

receiving, from the client device and based on the user accessing a first software product of the plurality of independent software products, a feature activation request with respect to the first software product;

in response to the feature activation request, accessing the workflow entitlement to identify one or more active features of the plurality of independent software products; and sending, to the client device, a feature activation response that activates the one or more active features of the plurality of independent software products on the client device, wherein the one or more active features are from the determined plurality of features to perform the predetermined workflow, and wherein the feature activation response causes one or more additional features of the plurality of independent software products to remain deactivated on the client device.

2. The method of claim 1, wherein receiving the feature activation request with respect to the first software product comprises receiving an indication of a command to startup the first software product on the client device, the feature activation request comprising a user identifier for the user and a device identifier for the client device.

3. The method of claim 2, further comprising:
determining, based on the user identifier and the device identifier, that the user is associated with the workflow entitlement for the client device; and
determining, based on the user being associated with the workflow entitlement for the client device, that the user has access to the one or more active features of the plurality of independent software products.

4. The method of claim 3, further comprising:
determining that the workflow entitlement is associated with a subscription to the one or more active features of the plurality of independent software products for a pre-determined period of time; and
disabling the one or more active features when the subscription has expired.

5. The method of claim 1, wherein selected features from different software products of the plurality of independent software products are modularized to work independent of one another.

6. The method of claim 1, further comprising:
in further response to the feature activation request with respect to the first software product, accessing the workflow entitlement to identify one or more active features of a second software product of the plurality of independent software products; and
sending, to the client device, the feature activation response that also activates the one or more active features of the second software product on the client device, wherein the one or more active features of the second software product are from the determined plurality of features to perform the predetermined workflow.

7. The method of claim 1, further comprising:
receiving a selection of a plurality of computer-based tasks associated with a plurality of predetermined workflows that accomplish the plurality of computer-based tasks;

determining that two or more of the plurality of predetermined workflows require a same selected feature; and establishing a subscription for the same selected feature that has a maximum duration of a plurality of workflow entitlements for the plurality of predetermined workflows.

8. An apparatus for a workflow-based software purchase comprising:
at least one processor; and
at least one non-transitory computer readable storage medium storing instructions that, when executed by the at least one processor, cause the apparatus to:
receive, from a client device based on input from a user, a selection of a computer-based task requiring independent features from multiple independent software products, wherein when performed in sequence, the independent features generate a predetermined workflow to accomplish the computer-based task;
determine a plurality of features for performing the predetermined workflow;
determine a plurality of independent software products based on the determined plurality of features, wherein each software product of the plurality of independent software products comprises a plurality of core features and a plurality of licensable features, and wherein the plurality of licensable features comprises at least one feature of the determined plurality of features and additional features and;
generate a workflow entitlement that indicates the predetermined workflow is activated for the user, wherein the workflow entitlement comprises a plurality of sub-entitlements corresponding to the determined plurality of features within the plurality of independent software products;
provide each software product of the plurality of independent software products to the client device for installation on the client device;
receive, from the client device and based on the user accessing a first software product of the plurality of independent software products, a feature activation request with respect to the first software product;
in response to the feature activation request, access the workflow entitlement to identify one or more active features of the plurality of independent software products; and
send, to the client device, a feature activation response that activates at least one core feature and the one or more active features of the plurality of independent software products on the client device, wherein the one or more active features are from the determined plurality of features to perform the predetermined workflow, and wherein the feature activation response causes one or more additional features of the plurality of independent software products to remain deactivated on the client device.

9. The apparatus of claim 8, further comprising instructions that, when executed by the at least one processor, cause the apparatus to determine that the workflow entitlement is associated with a subscription to the one or more active features of the plurality of independent software products for a pre-determined period of time, wherein the plurality of determined features are enabled when the subscription is active and disabled when the subscription is expired.

10. The apparatus of claim 9, wherein the plurality of determined features from different software products of the plurality of independent software products are modularized to work independent of one another.

11. The apparatus of claim 8, further comprising instructions that, when executed by the at least one processor, cause the apparatus to monitor and update a subscription status for a purchased subscription of the predetermined workflow.

12. The apparatus of claim 8, wherein the determined plurality of features from the plurality of independent software products accomplish a particular task associated with the predetermined workflow.

13. The apparatus of claim 12, further comprising instructions that, when executed by the at least one processor, cause the apparatus to:
receive a selection of a plurality of computer-based tasks associated with a plurality of predetermined workflows that accomplish the plurality of computer-based tasks;
determine that two or more of the plurality of predetermined workflows require a same product feature; and
establish a subscription for the same selected feature that has a maximum duration of a plurality of workflow entitlements for the plurality of predetermined workflows.

14. A non-transient computer readable medium for storing computer instructions that, when executed by at least one processor, causes a computer system to:
receive, from a client device based on input from a user, a selection of a computer-based task requiring independent features from multiple independent software products, wherein when performed in sequence, the independent features generate a predetermined workflow to accomplish the computer-based task;
determine a plurality of features for performing the predetermined workflow;
determine a plurality of independent software products based on the determined plurality of features, wherein each software product of the plurality of independent software products comprises at least one feature of the determined plurality of features, and wherein each software product of the plurality of independent software products comprises additional features in addition to the at least one feature of the determined plurality of features;
generate a workflow entitlement that indicates the predetermined workflow is activated for the user, wherein the workflow entitlement comprises a plurality of sub-entitlements corresponding to the determined plurality of features within the plurality of independent software products;
provide each software product of the plurality of independent software products to the client device for installation on the client device;
receive, from the client device and based on the user accessing a first software product of the plurality of independent software products, a feature activation request with respect to the first software product; and
send, to the client device, a feature activation response that activates one or more active features of the plurality of independent software products on the client device, wherein the one or more active features are from the determined plurality of features to perform the predetermined workflow, and wherein the feature activation response causes one or more additional features of the plurality of independent software products to remain deactivated on the client device.

15. The computer readable medium of claim 14, further comprising instructions that, when executed by the at least one processor, cause the computer system to receive the feature activation request with respect to the first software product by receiving a command to startup the first software product on the client device, the feature activation request comprising a user identifier for the user and a device identifier for the client device.

16. The computer readable medium of claim 15, further comprising instructions that, when executed by the at least one processor, cause the computer system to:
determine, based on the user identifier and the device identifier, that the user is associated with the workflow entitlement for the client device; and;
determine, based on the user being associated with the workflow entitlement for the client device, that the user has access to the one or more active features of the plurality of independent software products.

17. The computer-readable medium of claim 16, further comprising instructions that, when executed by the at least one processor, cause the computer system to:
determine that the workflow entitlement is associated with a subscription to the at least one feature of each software product of the plurality of independent software products for a pre-determined period of time; and
disable the one or more active features when the subscription has expired.

18. The computer readable medium of claim 14, wherein product features from different software products of the plurality of independent software products are modularized to work independent of one another.

19. The computer readable medium of claim 14, further comprising instructions that, when executed by the at least one processor, cause the computer system to determine that the user has access to a plurality of core features of the plurality of independent software products in addition to the one or more active features of the plurality of independent software products.

20. The computer readable medium of claim 19, further comprising instructions that, when executed by the at least one processor, cause the computer system to:
receive a selection of a plurality of computer-based tasks associated with a plurality of predetermined workflows that accomplish the plurality of computer-based tasks;
determine that two or more of the plurality of predetermined workflows require a same selected feature; and
establish a subscription for the same selected feature that has a maximum duration of a plurality of workflow entitlements for the plurality of predetermined workflows.

* * * * *